United States Patent
Rattman et al.

[11] Patent Number: 6,161,958
[45] Date of Patent: Dec. 19, 2000

[54] SELF DIAGNOSTIC HEAT DETECTOR

[75] Inventors: William Rattman, Orland, Fla.; Zhexin Mi, Toronto, Canada

[73] Assignee: Digital Security Controls Ltd., Concord, Canada

[21] Appl. No.: 09/089,258

[22] Filed: Jun. 3, 1998

[30] Foreign Application Priority Data

Jun. 4, 1997 [CA] Canada ................................. 2206969

[51] Int. Cl.⁷ .......................... G01K 15/00; G01K 7/16
[52] U.S. Cl. ............................. 374/1; 374/179; 327/512
[58] Field of Search ............................. 374/1, 162, 179, 374/183; 327/512

[56] References Cited

U.S. PATENT DOCUMENTS

| | | | |
|---|---|---|---|
| 3,558,980 | 1/1971 | Florance ................................. | 317/18 |
| 4,158,965 | 6/1979 | Prosky ................................. | 374/164 |
| 4,237,732 | 12/1980 | Grein et al. ........................... | 374/183 |
| 4,247,848 | 1/1981 | Kitta et al. ............................ | 340/584 |
| 4,310,837 | 1/1982 | Korhrumpf et al. ................... | 340/598 |
| 4,536,851 | 8/1985 | Germanton et al. ................... | 374/183 |
| 4,699,201 | 10/1987 | Wallenfag ............................. | 374/183 |
| 4,730,228 | 3/1988 | Einsinger et al. ..................... | 374/178 |
| 5,611,620 | 3/1997 | Wantz ................................... | 374/1 |
| 5,857,777 | 1/1999 | Schuh ................................... | 374/1 |

FOREIGN PATENT DOCUMENTS

| | | |
|---|---|---|
| 43 43 747 | 6/1994 | Germany . |
| 2 268 591 | 1/1994 | United Kingdom . |
| WO 96 39617 | 12/1996 | WIPO . |

OTHER PUBLICATIONS

Patent Abstracts of Japan; vol. 095, No. 006, Jul. 31, 1995 & JP 07 055588 A (Fujitsu Ltd), Mar. 3, 1995.

Patent Abstracts of Japan; vol. 095, No. 011, Dec. 26, 1995 & JP 07 225530 A (Canon Inc.), Aug. 22, 1995.

*Primary Examiner*—G. Bradley Bennett
*Assistant Examiner*—G. Verbitsky

[57] ABSTRACT

The present invention relates to an electronic heat detector having a self diagnostic mode. The heat detector is able to test the operation of a thermistor utilized for the temperature indicator of the heat detector. The thermistor is tested by applying electrical energy to the thermistor at a sufficient level for sufficient time to cause a measurable increase in the temperature of the thermistor. This level of increase of temperature of the thermistor is measured against an acceptable range for proper operation of the heat detector. The present invention also relates to a method for determining whether a heat detector is operating within acceptable limits, the heat detector utilizing a thermistor for temperature indication by the heat detector. The method comprises applying electrical energy to the thermistor at a sufficient level for sufficient time to cause a measurable increase in the temperature of the thermistor, and comparing the increase in temperature of the thermistor against an acceptable range for proper operation of the heat detector.

11 Claims, 1 Drawing Sheet

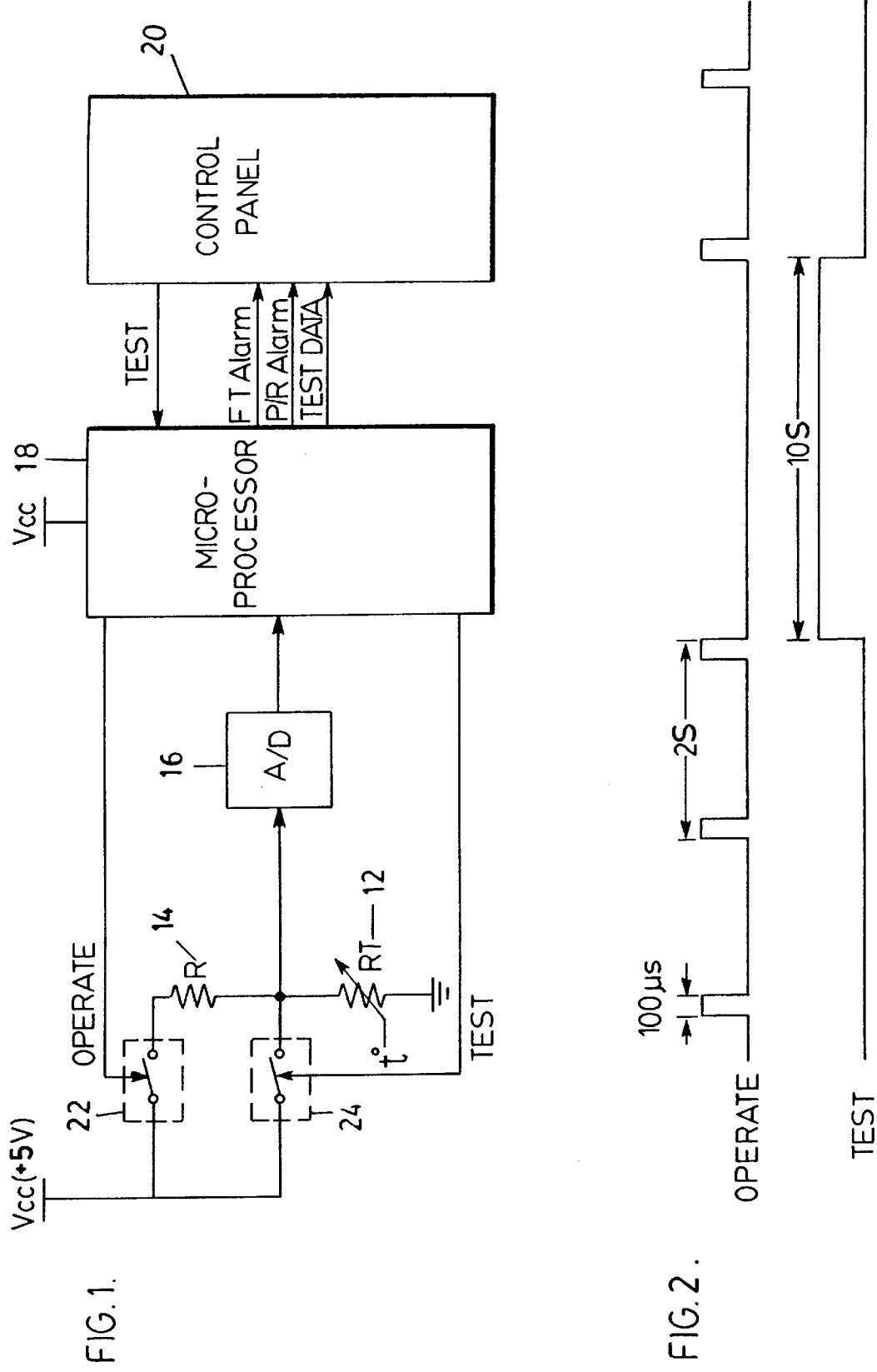

SELF DIAGNOSTIC HEAT DETECTOR

FIELD OF THE INVENTION

The present invention relates to a heat detector used in fire alarm systems and in particular, to a heat detector having a self diagnostic feature.

BACKGROUND OF THE INVENTION

Fire alarm systems are in common use for early warning of a fire condition. Such fire alarm systems generally use smoke detectors and/or heat detectors capable of detecting either the presence of smoke particles in an area or an increase in temperature in the area as a result of a fire condition. Smoke detectors operate on the principle of detecting the presence of a certain level of smoke particles within the area being monitored. Once the threshold level of smoke particles in the area has been exceeded, the smoke detector indicates the alarm condition. Such smoke detectors may operate on photoelectric light scattering principle, or on an ionization principle.

Another form of detector commonly utilized in fire alarm systems is a heat detector. Heat detectors generally trigger an alarm signal when either the actual temperature in the area being monitored exceeds a predetermined level, or when the rate of rise of the temperature in the area exceeds a predetermined level. Some detectors used in fire alarm systems incorporate both a smoke detector capability as well as a heat detector capability.

Heat detectors are rated according to how quickly they respond to a fire situation. The response of heat detectors are generally set according to specifications established by a Standards Organization, such as the Underwriter's Laboratory's (UL) standard to indicate a fire condition, which specifies a standard of the heat detectors being capable of indicating an alarm when the actual temperature in the area exceeds 57° C. (135° F.), or where the rate of rise of temperature in the area is 8.3° C. (15° F.) per minute or more.

In the past, heat detectors utilized thermocouples to monitor temperature conditions, however, in recent years, electronic heat detectors have been introduced. These detectors generally utilize a thermistor, which changes resistance value depending upon the temperature to which the thermistor is exposed, or a silicon temperature sensor. Smoke detectors have, for a number of years, been able to indicate when the detector is operating outside a usable range, such as for example, if the detector is decreased in sensitivity to such a point that the amount of smoke necessary for an alarm condition exceeds the established values, or where the smoke detector is increased in sensitivity to such an extent that an increased number of false alarms are present. Up to the present time it has not, however, been able to easily test heat detectors to determine whether they are operating within acceptable values.

SUMMARY OF THE INVENTION

The present invention relates to an electronic heat detector having a self diagnostic mode. The heat detector is able to test the operation of a thermistor utilized for the temperature indicator of the heat detector. The thermistor is tested by applying electrical energy to the thermistor at a sufficient level for sufficient time to cause a measurable increase in the temperature of the thermistor. This level of increase of temperature of the thermistor is measured against an acceptable range for proper operation of the heat detector.

In an aspect of the invention, there is provided a method for determining whether a heat detector is operating within acceptable limits, the heat detector utilizing a thermistor for temperature indication by the heat detector. The method comprises applying electrical energy to the thermistor at a sufficient level for sufficient time to cause a measurable increase in the temperature of the thermistor, and comparing the increase in temperature of the thermistor against an acceptable range for proper operation of the heat detector.

BRIEF DESCRIPTION OF THE DRAWINGS

Preferred embodiments of the present invention are illustrated in the drawings in which:

FIG. 1 is a block diagram of a heat detector, according to the present invention;

FIG. 2 is a timing diagram of the electrical energy input to the thermistor during operation and test modes.

DETAILED DESCRIPTION OF THE PREFERRED EMBODIMENTS

FIG. 1 illustrates, in a simplified block diagram, a preferred embodiment of the heat detector of the present invention. The heat detector has a thermistor 12 in series with a fixed resistor 14 arranged in a bridge circuit with the junction of the thermistor 12 and resistor 14 connected to an analog digital converter 16. The analog digital converter 16 converts the measured voltage on its input to a digital temperature word. This digital temperature word from the output of the analog digital converter 16 is inputted to a microprocessor 18 which examines the digital temperature word and compares it against threshold values stored in memory to provide early fire warning. The microprocessor 18 also controls the operation of the heat detector and is connected to a fire alarm control panel 20 in a manner to permit the microprocessor to pass the fixed temperature alarm (FT alarm), rate of rise alarm (RR alarm) and test data to the control panel as well as to receive control signals from the control panel 20.

It is not necessary for the heat detector circuitry to be active continuously, rather, in the interest in conserving energy and extending the life of the components of the heat detector, it is preferred if the heat detector circuitry is sampled at a sampling rate which provides for Early detection of fire conditions while conserving energy end the life of the component. Typically, the heat detector is sampled for a period of about 50 to about 200 microseconds every 1 to 5 seconds. Most preferably, as shown in FIG. 2, microprocessor 18 instructs the heat detector to provide a 100 microsecond pulse every 2 seconds to the bridge circuit for the normal pulse operation. This is accomplished by switching an operate switch 22 to apply the voltage to the bridge circuit. The operate switch 22 is preferably a solid state switch such as a suitable solid state switching transistor, but other types of switching devices capable of rapid switching on a frequent basis may be utilized.

The output voltage from the junction of the fixed resistor 14 and thermistor 12 is applied to the analog digital converter 16 and converted into a digital temperature word which is processed by the microprocessor 18. The analog digital converter is selected to have a resolution element sufficiently sensitive enough to rapidly detect the presence of fire conditions. This is especially important in the rate of rise situation where the analog digital converter has to discriminate between voltage levels arising from a change in temperature of the thermistor at a rate of 8.3° C. (15° F.) per minute and should be able to give an alarm condition indication when that rate of rise is met or exceeded for a period of 20 to 30 seconds. Thus the analog digital converter should be sensitive enough to be capable of distinguishing a temperature change of the thermistor of about 3° C. to 4° C. (about 5° F. to 8° F.) over a 20 to 30 second period.

The 100 microsecond pulses are applied to the circuit at a regular interval, generally on the order of about every two seconds. The thermistor 12 has a resistance which is temperature dependent. As the temperature to which the thermistor 12 is exposed increases, the resistance of the thermistor 12 decreases. As the resistance of the thermistor 12 decreases, the voltage drop across the fixed resistor 14 increases and the voltage level seen at the junction in the bridge circuit decreases. If the voltage change, as converted to the digital temperature word, is sufficient to exceed threshold values set in the heat detector, either in terms of the absolute temperature or in terms of the rate of rise of the temperature, then the microprocessor 18 indicates the high temperature alarm and sends the appropriate signal to the control panel 20, either the fixed temperature alarm or the rate of rise alarm.

In the test mode, the microprocessor 18 commands a switching device 24 to apply the full circuit voltage to the thermistor 12, shorting out the fixed resistor 14. Similar to the operate switch, switching device 24 is preferably a solid state switching transistor. The length of the test command pulse is sufficiently long to enable the increased voltage through the thermistor 12 to raise the internal temperature of the thermistor 12, and thereby lower its resistance by a measurable value. With a 1K thermistor 12, it has been found that a test pulse of about 10 seconds with a 5 volt DC level will raise the internal temperature of the thermistor 12 by 3.5° C. and lower its resistance. At the end of the 10 second exposure to the full DC level, the circuit is returned to normal, and immediately a normal 100 microsecond operate pulse is applied to measure the output of the series bridge. If the output of the series bridge, and consequently the input to the analog digital converter 16 is within an acceptable limit, then the heat detector, and particularly the thermistor 12, is operating within its acceptable range. If the voltage seen at the end of the test command pulse is not within the range specified, then a trouble signal would be passed by the microprocessor 18 to the control panel 20 to alert that the heat detector is not operating within acceptable specifications. After the test command pulse, the circuit returns to normal in a brief period of a few seconds and returns to normal pulse operating mode.

A prototype of a heat detector of the present invention has been designed utilizing a low resistance 1K thermistor of a glass encapsulated family. This thermistor is placed in series with a fixed 1K resistor. In normal operation, the value of the thermistor is such to provide an output on the operate pulse of approximately 2.5 volts as a signal to the analog digital converter which has a resolution capability of about 20 millivolts. The fixed temperature signal is set at 57° C. (135° F.) which if exceeded, causes the resistance of the thermistor to decrease to about 336 ohms resulting in a decrease of the output voltage from the operated pulse applied to the bridge circuit to about 1.2 volts. This voltage, when converted to the digital temperature word, and compared with the threshold value by the microprocessor results in a fixed temperature alarm signal being sent to the control panel. Similarly, if the change over a series of operate pulses is found to exceed a rate of change of about 390 millivolts per minute, which would indicate a change in temperature of greater than 8.3° C. (15° F.) per minute, then the microprocessor would indicate to the alarm panel that a rate of rise alarm condition exists. In the test mode, using the heat detector with the 1K thermistor, applying a full circuit voltage of 5 volts DC in a test command pulse of 10 seconds, resulted in a 25 milliwatt power dissipation taking place in the thermistor during this interval. This raised the internal temperature of the thermistor by 3.5° C. and lowered its resistance. At the end of the 10 second exposure to the full 5 volt DC level, the input voltage to the analog digital converter was found to be some 180 millivolts lower. This change from about 9 resolution elements of the analog digital quantitization capability is readily detected by the microprocessor and processed as a successful test.

The frequency of the test of the thermistor 12 and heat detector can be varied and set by the microprocessor 18. In most situations, the heat detector may go through its test cycle one or more times daily, generally on the order of 3 to 4 times a day. In addition, as set out in FIG. 1, the control panel 20 could also control the frequency of the testing of the heat detector by sending a test signal instructing the microprocessor 18 to enter the test mode. Once again, this testing of the heat detector would generally be on the order of several times daily or less.

The heat detector of the present invention, having the self testing mode, results in a heat detector which tests the entire circuit, thermistor sensor and downstream signal processing circuitry. This heat detector provides for a early warning of a heat detector which is not operating within an acceptable range and allows for rapid and easy maintenance of heat detector sensitivities and capabilities.

The heat detector of the present invention is also useful for other applications which require temperature monitoring in addition to the fire alarm situation. For example, the heat detector of the present invention would also be useful for a temperature alarm condition in cold rooms, such as refrigerators and freezers. Such facilities are generally utilized to maintain perishable goods at about a set temperature. If the temperature in the facility increases, then there is a likelihood of spoilage of the perishable goods. It is therefore important in such applications that the temperature detector, i.e. the heat detector of the present invention, be capable of not only Indicating when the temperature in the facility is increased dangerously high, but also be capable of providing feedback that the operation of the temperature detector is within acceptable ranges.

The heat detector of the present invention could also be adapted to provide for temperature monitoring from the control panel. The heat detector of the present invention has a capability of providing an accurate feedback of the actual temperature conditions within the space being monitored. This actual temperature reading could be passed through to the control panel for monitoring or recording purposes for maintaining an indication of the actual temperature within the space being monitored.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. A heat detector having a self diagnostic mode, the heat detector comprising a thermistor utilized for temperature indication by the heat detector, a means for applying an alarm condition pulse of a DC electrical energy to the thermistor to generate a voltage drop across the thermistor, a means for measuring the voltage drop across the thermistor, a means for converting the measured voltage to a digital word and a means for comparing the digital word to values of the digital word stored in a memory indicative of an alarm condition; the heat detector further including a means for applying a self diagnostic test pulse DC electrical energy to the thermistor at a level for a predetermined time to cause a transient measurable increase in the temperature of the thermistor, and a means for comparing the transient increase in temperature of the thermistor against an acceptable range for proper operation of the heat detector immediately after the predetermined time by applying a test pulse to the thermistor and comparing the measured digital word to values of the digital word indicative of proper operation of the heat detector stored in the memory.

2. A heat detector as claimed in claim 1 wherein the means for applying the alarm condition test pulse comprises a first switching arrangement to switch a DC electrical energy to input of the thermistor.

3. A heat detector as claimed in claim 2 wherein the means for applying the self diagnostic test pulse to the thermistor comprises a second switching arrangement to switch a DC electrical energy to an input of the thermistor.

4. A heat detector as claimed in claim 2 wherein the first and second switching arrangement is controlled by a microprocessor.

5. A heat detector as claimed in claim 4 wherein the values of the digital temperature word are compared by the microprocessor.

6. A method for determining whether a heat detector is operating within acceptable limits, the heat detector utilizing a thermistor for temperature indication by the heat detector, a means of applying an alarm condition test pulse to the thermistor and a means for measuring the voltage across the thermistor and comparing the value to values stored in a memory, the method comprising applying a DC electrical energy to the thermistor for a predetermined time to cause a measurable increase in the temperature of the thermistor, stopping the application of the DC electrical energy after the predetermined time and immediately applying a test pulse to the thermistor to compare the increase in temperature of the thermistor against an acceptable range for proper operation of the heat detector.

7. A method as claimed in claim 6 wherein the DC electrical energy is applied to the thermistor by a switching arrangement switching DC electrical energy to an input of the thermistor.

8. A method as claimed in claim 7 wherein the switching arrangement is controlled by a microprocessor.

9. A method as claimed in claim 8 wherein the increase in temperature of the thermistor is compared using a converter to convert the output of the thermistor to a digital temperature word.

10. A method as claimed in claim 9 wherein the digital temperature word of the output of the converter is compared to values of the digital temperature word stored in a memory indicating limits for proper operation of the heat detector.

11. A method as claimed in claim 10 wherein the values of the digital temperature word are compared by the microprocessor.

* * * * *